US011384446B2

(12) United States Patent
Whitten et al.

(10) Patent No.: US 11,384,446 B2
(45) Date of Patent: Jul. 12, 2022

(54) COMPOSITIONS AND METHODS FOR THE ELECTRODEPOSITION OF NANOTWINNED COPPER

(71) Applicant: MacDermid Enthone Inc., Waterbury, CT (US)

(72) Inventors: Kyle M. Whitten, Cheshire, CT (US); Stephan I. Braye, West Haven, CT (US); Jianwen Han, Southbury, CT (US); Pingping Ye, Bethany, CT (US); Thomas B. Richardson, Killingworth, CT (US); Elie H. Najjar, Norwood, MA (US)

(73) Assignee: MacDermid Enthone Inc., Waterbury, CT (US)

( * ) Notice: Subject to any disclaimer, the term of this patent is extended or adjusted under 35 U.S.C. 154(b) by 0 days.

(21) Appl. No.: 17/005,407

(22) Filed: Aug. 28, 2020

(65) Prior Publication Data

US 2022/0064812 A1    Mar. 3, 2022

(51) Int. Cl.
*C25D 3/38* (2006.01)
*C25D 5/00* (2006.01)
*B82Y 40/00* (2011.01)
*B82Y 30/00* (2011.01)

(52) U.S. Cl.
CPC ............... *C25D 3/38* (2013.01); *C25D 5/605* (2020.08); *B82Y 30/00* (2013.01); *B82Y 40/00* (2013.01)

(58) Field of Classification Search
None
See application file for complete search history.

(56) References Cited

U.S. PATENT DOCUMENTS

| 7,074,315 | B2 | 7/2006 | Desmaison |
| 10,566,314 | B2 | 2/2020 | Yang |
| 2004/0020783 | A1* | 2/2004 | Urrutia Desmaison . C25D 3/38 205/291 |
| 2011/0290659 | A1* | 12/2011 | Roeger-Gopfert ...... C08L 79/02 205/297 |
| 2012/0128888 | A1 | 5/2012 | Roeger-Goepfert et al. |
| 2015/0014177 | A1 | 1/2015 | Kretschmer et al. |
| 2017/0114469 | A1 | 4/2017 | Thorseth et al. |
| 2019/0136397 | A1* | 5/2019 | Kao ......................... C25D 3/38 |

FOREIGN PATENT DOCUMENTS

| TW | 201715089 | 5/2017 |
| WO | 2020092244 W | 5/2020 |

OTHER PUBLICATIONS

Li, Yu-Jin, et al. Tensile Properties of <111>-Oriented Nanotwinned Cu with Different Columnar Grain Structures, Materials 2020, 13, 1310.
Ovid'Ko, I.A. et al., Mechanical Properties of Nanotwinned Metals: A Review, Rev. Adv. Mater. Sci. 44 (2016), 1-25.
Chung, S. et al., Electroplated Nano Twinned Copper for Wafer Level Packaging, ResearchGate, Oct. 2016, pp. 1-7.

* cited by examiner

*Primary Examiner* — Wojciech Haske
(74) *Attorney, Agent, or Firm* — Carmody Torrance Sandak & Hennessey LLP

(57) ABSTRACT

A copper electroplating solution comprising a copper salt, a source of halide ions, and a linear or branched polyhydroxyl. The copper electroplating solution is used to deposit copper having a high density of nanotwinned columnar copper grains on a substrate. The linear or branched polyhydroxyl may comprise a reaction product between 2,3-epoxy-1-propanol and aminic alcohol or ammonium alcohol.

12 Claims, 8 Drawing Sheets

COMPOSITIONS AND METHODS FOR THE ELECTRODEPOSITION OF NANOTWINNED COPPER

FIELD OF THE INVENTION

The present invention generally relates to the electrodeposition of nanotwinned copper and electrolytic copper plating baths for producing nanotwinned copper deposits.

BACKGROUND OF THE INVENTION

Electrochemical deposition processes are well-established in integrated circuit fabrication. Copper lines are formed by electroplating the metal into very thin, high-aspect-ratio trenches and vias in a methodology commonly referred to as "damascene" processing (pre-passivation metallization).

Copper is one of the most essential conductors in microelectronic devices due to high ductility and conductivity. With the advancement of microelectronics, there is a continual need to create smaller and denser interconnect features. One method towards this goal is the removal of solder between two separate substrates that connect copper vias, pads, bumps, or pillars, which can be accomplished, for example, by process of Cu—Cu hybrid bonding.

Due to the combination of excellent mechanical properties, good conductivity, and unique structure, nanotwinned copper has drawn attention for use in microelectronics.

In particular, the mechanical strength of metallic materials such as copper generally increases when the size of the crystal grain is reduced to a nanoscale level. Nanotwinned copper represents ultrafine-grain copper whose grains contain a high density of layered nanoscopic twins divided by coherent twin boundaries. By introducing nanoscale twins into the microstructure of copper, properties such as mechanical strength, ductility, electromigration resistivity, and hardness can be improved.

Some nanoscale levels of thin metal films can even have particular mechanical properties. As a result, it has been found that metal having nanotwin crystalline properties can be suitable for applications of through silicon via, semiconductor chip interconnect, packaging substrate pin through hole, metal interconnect (for example, copper interconnect), or metal materials on substrate.

Nanotwinned copper can be achieved in several ways, including, for example, sputtering and electrolytic deposition. One of the advantages of sputtering is the high purity in the copper film, with the ability to contour the preferred orientation of grains. Sputtered (111)-oriented nanotwinned copper has been shown to have high thermal stability and strength. On the other hand, direct current electrolytic plating is very compatible with industrial mass production, and electroplated nanotwinned copper can be classified into two groups—equiaxial grain nanotwinned copper and (111)-oriented nanotwinned copper.

Crystal defects can influence mechanical, electrical, and optical properties of the material. Twinning may occur in a material where two parts of a crystal structure are symmetrically related to one another. In a face-centered cubic (FCC) crystal structure, of which copper is included, coherent twin boundaries may be formed as (111) mirror planes from which the typical stacking sequence of (111) planes is reversed. In other words, adjacent grains are mirrored across coherent twin boundaries in a layered (111)-structure. Twins grow in a layer-by-layer manner extending along a lateral (111) crystal plane where a twin thickness is on the order of nanometers, hence the name "nanotwins." Nanotwinned copper (nt-Cu) exhibits excellent mechanical and electrical properties and may be used in a wide variety of applications in wafer-level packaging and advanced packaging designs.

Compared to copper having conventional grain boundaries, nanotwinned copper possesses strong mechanical properties, including high strength and high tensile ductility. Nanotwinned copper also demonstrates high electrical conductivity, which may be attributable to the twin boundary, causing electron scattering that is less significant compared to a grain boundary. Furthermore, nanotwinned copper exhibits high thermal stability, which may be attributable to the twin boundary having excess energy on the order of magnitude lower than that of a grain boundary. In addition, nanotwinned copper enables high copper atom diffusivity, which is useful for copper-to-copper direct bonding. Nanotwinned copper also shows high resistance to electromigration, which may be a result of twin boundaries slowing down electromigration-induced atomic diffusion. Nanotwinned copper demonstrates a strong resistance to seed etch that may be important in fine-line redistribution layer applications. Nanotwinned copper also shows low impurity incorporation, which results in fewer Kirkendall voids as a result of soldered reactions with the nanotwinned copper.

In some implementations, nanotwinned copper enables direct copper-copper bonding. Such copper-copper bonding may occur at low temperatures, moderate pressures, and lower bonding forces/times. Typically, the deposition of copper structures results in rough surfaces. In some implementations, prior to copper-copper bonding, electrodeposition of nanotwinned copper may be followed by an electropolishing process to achieve smooth surfaces. With the smooth surfaces, the nanotwinned copper structure may be used in copper-copper bonding with shorter bonding times, lower temperatures, and fewer voids.

U.S. Pat. No. 7,074,315 to Desmaison et al., the subject matter of which is herein incorporated by reference in its entirety, describes a copper electrolyte for depositing a matte layer of copper. The electrolytic copper plating bath comprises at least one polyhydroxyl compound selected from poly(1,2,3-propanetriol), poly(2,3-epoxy-1-propanol), and derivatives thereof to produce copper deposits that are matte and show a uniform, slight roughness to provide, without additional pretreatment, a sufficient bond of organic coatings. However, there is no suggestion as to the use of the copper electrolyte for depositing nanotwinned copper.

WO2020/092244 to Banik et al., the subject matter of which is herein incorporated by reference in its entirety, describes a copper structure having a high density of nanotwinned copper deposited on a substrate. Banik does not describe the particular electrolytic copper plating bath but instead describes electroplating conditions, including applying a pulsed current waveform that alternates between constant current and no current, where the duration of no current being applied is substantially greater than a duration of a constant current being applied.

U.S. Pat. No. 10,566,314 to Yang, the subject matter of which is herein incorporated by reference in its entirety, describes how the optimal copper grain structure for Cu—Cu metal to metal bonding is columnar grain microstructure. The copper grain microstructure plated by the disclosed suppressor-only system produces a columnar grain structure as a result of plating nanotwinned copper. While columnar grains are mentioned, there is no mention of (111) copper grain structure of nanotwinning copper.

Thus, there remains a need in the art for an improved electrolytic copper solution for producing nanotwinned copper deposits. In addition, there remains a need in the art for an improved electrolytic copper solution that can deposit nanotwinned copper in (111) orientation and with a high percentage of nanotwinning.

SUMMARY OF THE INVENTION

It is an object of the present invention to provide an improved copper electroplating solution.

It is another object of the present invention to provide a copper electroplating solution that is capable of producing nanotwinned copper in the deposit.

It is still another object of the present invention to provide nanotwinned copper in (111) orientation.

It is yet another object of the present invention to provide a copper deposit having a high density of nanotwinning.

To that end, in one embodiment, the present invention generally relates to a copper electroplating solution used to produce nanotwinned copper comprises typically:

A) a copper salt;
B) a source of halide ions; and
C) a linear or branched polyhydroxyl.

In another embodiment, the present invention also relates generally to a method of using the copper electroplating solution described herein to produce a copper deposit having a high density of nanotwinning.

DETAILED DESCRIPTION OF THE PREFERRED EMBODIMENTS

Figure 1:
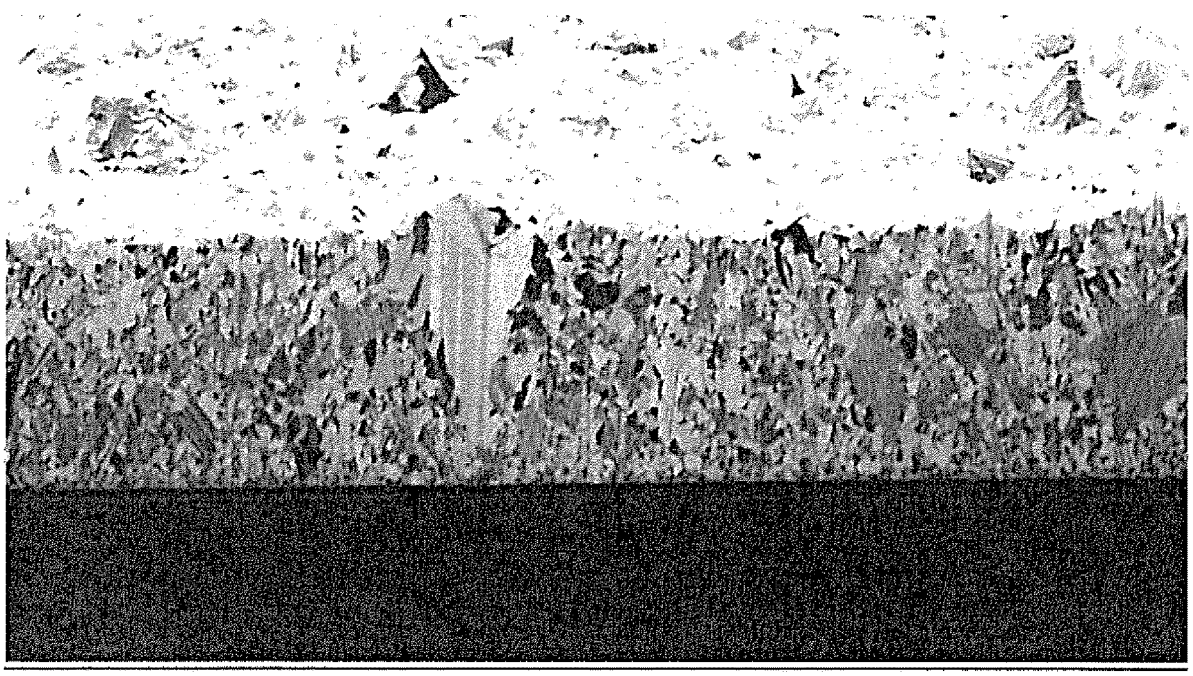
FIG. 1 depicts an SEM (30 µm width at 10K magnification) of a copper deposit produced in accordance with Comparative Example 1.

The inventors of the present invention have discovered that electrodeposition of high density of nanotwin copper in (111) orientation can enable smaller and denser interconnect features between two separate substrates used to connect copper vias, pads, bumps, pillars, etc. via Cu—Cu hybrid bonding.

As used herein, "a," "an," and "the" refer to both singular and plural referents unless the context clearly dictates otherwise.

As used herein, the term "about" refers to a measurable value such as a parameter, an amount, a temporal duration, and the like and is meant to include variations of +/−15% or less, preferably variations of +/−10% or less, more preferably variations of +/−5% or less, even more preferably variations of +/−1% or less, and still more preferably variations of +/−0.1% or less of and from the particularly recited value, in so far as such variations are appropriate to perform in the invention described herein. Furthermore, it is also to be understood that the value to which the modifier "about" refers is itself specifically disclosed herein.

As used herein, spatially relative terms, such as "beneath," "below," "lower," "above," "upper" and the like, are used for ease of description to describe one element or feature's relationship to another element(s) or feature(s) as illustrated in the figures. It is further understood that the terms "front" and "back" are not intended to be limiting and are intended to be interchangeable where appropriate.

As used herein, the terms "comprises" and/or "comprising," specify the presence of stated features, integers, steps, operations, elements, and/or components, but do not preclude the presence or addition of one or more other features, integers, steps, operations, elements, components, and/or groups thereof.

As used herein, the term "substantially free" or "essentially free" if not otherwise defined herein for a particular element or compound means that a given element or compound is not detectable by ordinary analytical means that are well known to those skilled in the art of metal plating for bath analysis. Such methods typically include atomic absorption spectrometry, titration, UV-Vis analysis, secondary ion mass spectrometry, and other commonly available analytically techniques.

All amounts are percent by weight unless otherwise noted. All numerical ranges are inclusive and combinable in any order except where it is logical that such numerical ranges are constrained to add up to 100%.

The terms "plating" and "deposit" or "deposition" are used interchangeably throughout this specification. The terms "composition" and "bath" and "solution" are used interchangeably throughout this specification. The term "alkyl," unless otherwise described in the specification as having substituent groups, means an organic chemical group composed of only carbon and hydrogen and having a general formula: $C_nH_{2n+1}$. The term "average" is equivalent to the mean value of a sample. All amounts are percent by weight unless otherwise noted. All numerical ranges are inclusive and combinable in any order except where it is logical that such numerical ranges are constrained to add up to 100%.

In one embodiment, the present invention generally relates to the electrodeposition of nanotwinned copper, and the copper electroplating solution used to produce nanotwinned copper comprises typically:

A) a copper salt;
B) a source of halide ions; and
C) a linear or branched polyhydroxyl.

In a preferred embodiment, the copper salt comprises copper sulfate. Other copper salts usable in the composition include copper methane sulfonate, copper pyrophosphate, copper propanesulfonate, and other similar compounds. The concentration of copper sulfate in the electroplating solution is generally in the range of about 1-100 g/L, more preferably in the range of about 20 to about 80 g/L, most preferably within the range of about 40 to about 60 g/L.

The halide ions may act as bridges to assist adsorption of certain organic additives onto a substrate surface. Halide ions include, but are not limited to, chloride ions, bromide ions, iodide ions, and combinations thereof. In one embodiment, the halide ions comprise chloride ions. The concentration of chloride ions in the electroplating solution is generally within the range of about 1-150 mg/L, more preferably about 30-120 mg/L, most preferably about 45-75 mg/L.

The linear or branched polyhydroxyl generally has a molecular weight of about 200 to about 20,000 g/mol, more preferably about 500 to about 5,000 g/mol, most preferably about 1,000 to about 3,000 g/mol. In a preferred embodiment, the linear or branched polyhydroxyl comprises poly (2,3-epoxy-1-propanol). In one embodiment, the concentration of the linear or branched polyhydroxyl is within the range of about 1 to about 10,000 mg/L, more preferably about 10 to about 1,000 mg/L, most preferably about 50 to about 600 mg/L.

In addition, the electroplating composition may contain an acid to control the conductivity of the plating bath, and suitable acids include sulfuric acid and methane sulfonic acid. In one embodiment, the acid is sulfuric acid. The concentration of acid in the electroplating solution is generally within the range of about 0 to 240 g/L, more preferably within the range of about 10 to about 180 g/L, most preferably within the range of about 80 to about 140 g/L.

The inventors have also surprisingly found that reacting aminic alcohols or ammonium alcohols with 2,3-epoxy-1-propanol can improve the properties of the nanotwinned copper. These polyhydroxyl compounds that are initiated by a core containing a nitrogen species can increase the columnar nanotwinned copper density and help initiate the nanotwinned copper more quickly than poly(2,3-epoxy-1-propanol).

Examples of these aminic alcohols include, but are not limited to, ethanolamine, diethanolamine, triethanolamine, propanolamine, isopropanolamine, diisopropanolamine, triisopropanolamine, N-methyl diethanolamine, N-ethyl diethanolamine, N-propyl diethanolamine, methyl monoethanolamine, N,N-dimethyl ethanolamine, N,N-diethyl ethanolamine, N-propyl monoethanolamine, N-propyl diethanolamine, N-butyl ethanolamine, N-butyl diethanolamine, N,N-dibutyl ethanolamine, hydroxy ethyl morpholine, 2-piperidino ethanol, diethanol isopropanolamine, N-(2-hydroxyethyl) pyrrolidine, and combinations of the foregoing.

In addition, an aminic alcohol can convert to an ammonium salt by quaternizing the nitrogen, for example, by means of a methylating agent such as dimethylsulfate.

Examples of ammonium alcohols include, but are not limited to, choline chloride, b-methylcholine chloride, bis (2-hydroxyethyl)dimethylammonium chloride, tris(2-hydroxyethyl)methylammonium chloride, carnitine chloride, (2-hydroxyethyl)dimethyl(3-sulfopropyl)ammonium chloride, and combinations of the foregoing.

In reacting an aminic or ammonium alcohol with 2,3-epoxy-1-propanol, the molar ratio of the amine to the 2,3-epoxy-1-propanol is generally in the range of about 0.01 to 0.50, more preferably in the range of 0.01 to 0.20, and more preferably in the range of 0.01 to 0.10.

The inventors have also found that the introduction of other organic electroplating compounds can disrupt the ability of the polyhydroxyl material to produce nanotwinned copper. These prohibitive compounds include accelerators, brighteners, carriers, wetters, and/or levelers. Thus, in a preferred embodiment, the electroplating solution is at least substantially free of any accelerator, brightener, carrier, wetter, and/or leveler or any compound that can function as an accelerator, brightener, carrier, wetter, and/or leveler. By "substantially free of" what is meant is that the electroplating solution contains less than 20 ppm, more preferably less than about 10 ppm, and most preferably less than about 3 ppm of any compound that can function as an accelerator, brightener, carrier, wetter, and/or leveler.

In one preferred embodiment, the copper electroplating composition of the present invention comprises:
A) about 40 to about 60 g/L copper ions;
B) about 80 to about 140 g/L sulfuric acid;
C) about 30 to about 120 mg/L chloride ions;
D) about 300 to about 500 mg/L of a linear or branched polyhydroxyl, wherein the polymer may or may not contain a nitrogen-containing species.

In another preferred embodiment, the present invention consists essentially of a copper electroplating composition capable of electrodepositing copper having a high density of nanotwinned copper, the electroplating composition consisting essentially of:
A) about 40 to about 60 g/L copper ions;
B) about 80 to about 140 g/L sulfuric acid;
C) about 30 to about 120 mg/L chloride ions;
D) about 300 to about 500 mg/L of a linear or branched polyhydroxyl wherein the polymer may or may not contain a nitrogen-containing species.

By "consisting essentially of," what is meant is that the composition is free of any additive that would have a detrimental effect on the ability of the composition to produce a nanotwinned copper deposit.

The present invention also relates generally to a method of electroplating nanotwinned copper on a substrate, the method comprising the steps of:
A) providing the substrate, at least one anode, and the copper plating bath described above;
B) contacting the surface of the substrate and the at least one anode, respectively, with the copper bath; and
C) applying an electric voltage between the surface of the workpiece and the at least one anode such that cathodic polarity is imposed upon the substrate relative to the at least one anode;
wherein a copper structure having a high density of nanotwinning is deposited on the substrate.

In some embodiments, the nanotwinned copper structures have a plurality of (111) crystal grain structures. Furthermore, to ensure the success of this method, which requires elevated temperatures and pressures, it is generally preferred to generate electroplated copper in (111) orientation with >90% nanotwinned columnar copper (nt-Cu) grains. While not being held to a particular theory, it is hypothesized that when the two nanotwinned copper substrates come into contact and are exposed to the necessary temperatures and pressures, the nanotwinned copper growth will extend between the boundaries of the copper substrate, forming a Cu—Cu bond that extends across the interface.

The current density is generally in the range of about 0.01 to about 50 ASD, more preferably about 0.5 to about 20 ASD, most preferably about 1 to about 10 ASD. In addition, the electroplating solution is preferably agitated, and the electroplating solution is generally mixed at about 1 to about 2,500 rpm, more preferably about 10 to about 1,200 rpm, most preferably about 50 to about 400 rpm.

The anode is preferably an insoluble anode.

The copper is electrodeposited for some time to plate copper to a thickness of about 0.1 to about 1,000 μm, more preferably about 0.3 to about 200 μm, most preferably about 1 to about 100 μm.

Substrates that can be plated with the copper electroplating solution include, for example, pillars, pads, lines, and vias.

The presence of nanotwinned grain structures can be observed using any suitable microscopy technique, such as an electron microscopy technique. The amount of nanotwinned grain structure in the copper deposit is preferably greater than about 80%, more preferably greater than about 90% nanotwinned columnar copper grains, which is estimated based on SEM cross-sections.

As set forth in the examples below, nanotwinned copper structures may be characterized by a plurality of (111)-oriented crystal copper grains containing a majority of nanotwins. In some implementations, the plurality of (111)-oriented crystal copper grains contain a high density of nanotwins. As used herein, a "high density of nanotwins" may refer to copper structures having greater than about 80% nanotwinning, and even greater than about 90% nanotwinning as observed using suitable microscopy techniques.

The crystal orientation of the crystal copper grains may be characterized using a suitable technique such as electron backscatter diffraction (EBSD) analysis. In some implementations, crystal orientation maps may be displayed in inverse pole figure (IPF) maps. In accordance with the present invention, it is preferably that the nanotwinned copper structures contain primarily (111)-oriented grains.

Comparative Example 1

A copper electrolytic composition was prepared to contain a solution of 50 g/L copper(II) ion, 100 g/L sulfuric acid, 50 mg/L chloride ion, and 400 mg/L polyethylene glycol (PEG) and disposed of in a plating cell. A blanket PVD copper substrate was submerged into the plating cell at 25° C. Agitation was set to 300 rpm, and a current density of 6 ASD was applied for 500 s in order to plate a 10 μm film of copper.

As depicted in FIG. 1, the SEM cross-section reveals the absence of nanotwinned copper in the plated film of copper.

Example 2

The same bath and substrate, as described in Comparative Example 1, was prepared; however, the PEG was replaced with 400 mg/L of poly(2,3-epoxy-1-propanol) and electroplated under the same plating conditions. The results showed a majority of nanotwinned copper.

Figure 2:
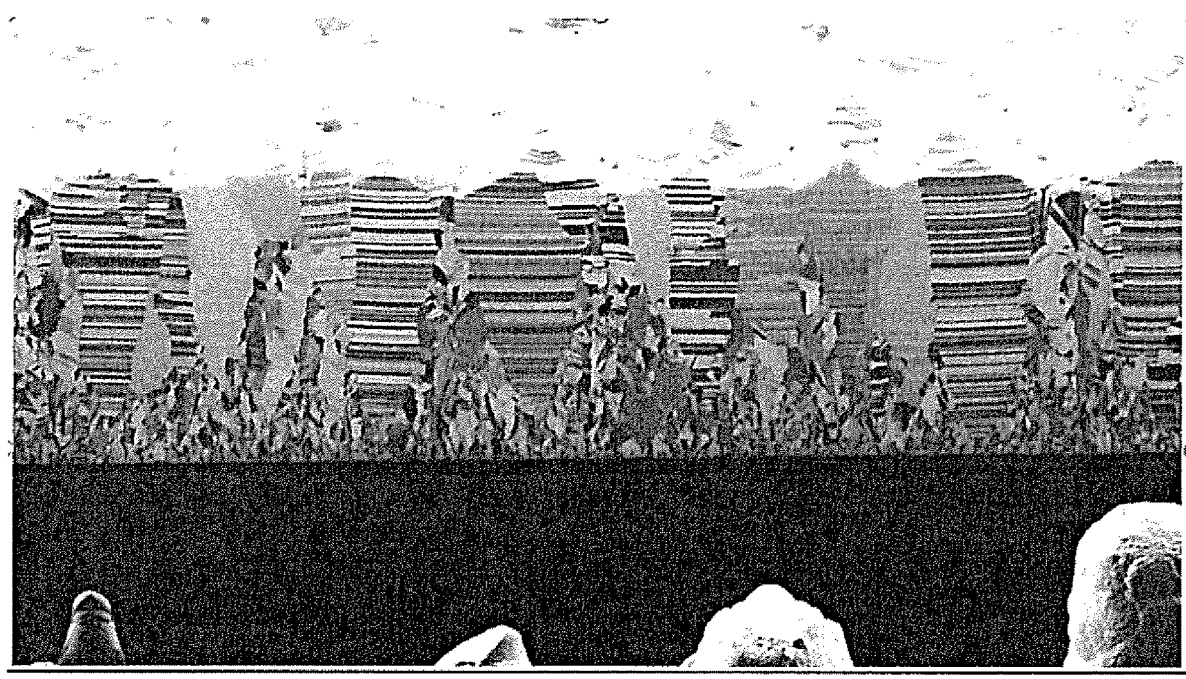
FIG. 2 depicts an SEM (30 µm width at 10K magnification) of a copper deposit produced in accordance with Example 2.

As depicted in FIG. 2, the SEM cross-section shows a majority of nanotwinned copper in the plated film. The grains are highly columnar and have a high density of grown-in nanotwins.

Comparative Example 3

Figure 3:
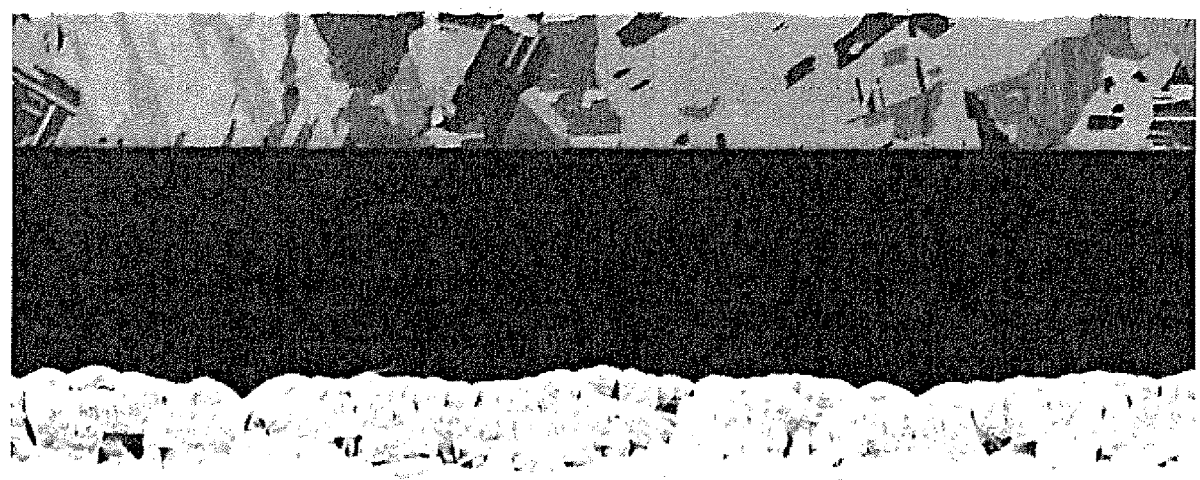
FIG. 3 depicts an SEM (30 µm width at 10K magnification) of a copper deposit produced in accordance with Comparative Example 3.

The same bath and substrate, as described in Example 2 was prepared, except that 1 mg/L of bis(sodium sulfopropyl) disulfide (SPS) (brightening agent) was added to the solution and electroplated under the same plating conditions. The results showed that the addition of a conventional brightening agent to the composition resulted in a complete loss of nanotwinned copper in the plated film, as seen in FIG. 3.

Comparative Example 4

Figure 4:
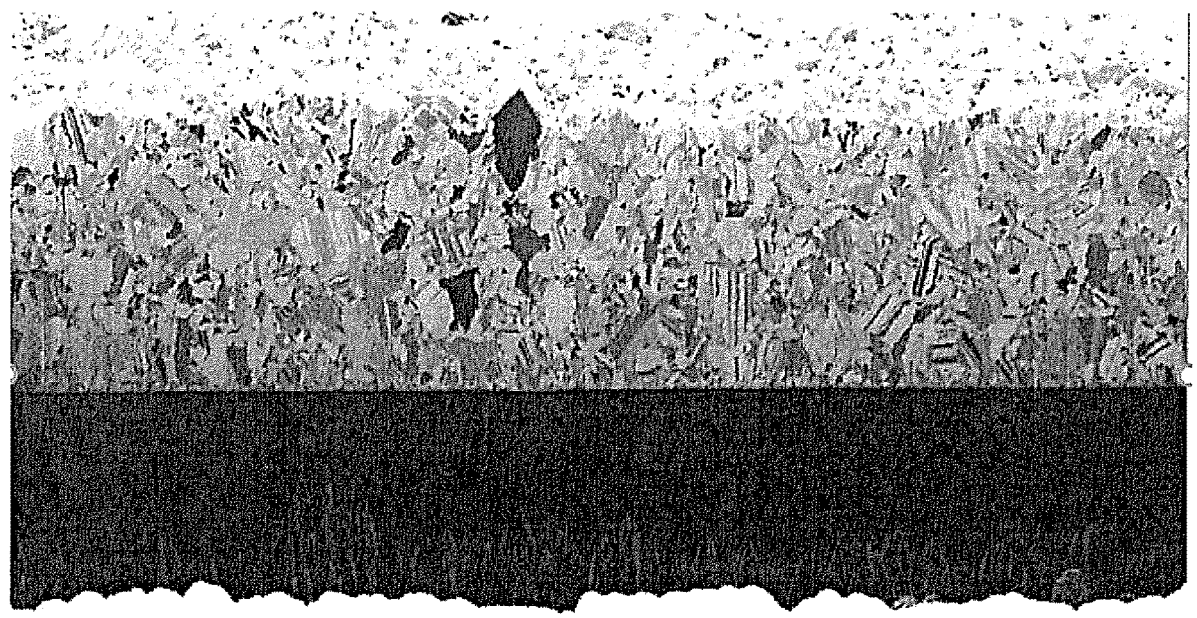
FIG. 4 depicts an SEM (60 µm width at 5K magnification) of a copper deposit produced in accordance with Comparative Example 4.

The same bath and substrate, as described in Example 2, was prepared. However, 5 mg/L of a cationic nitrogen leveler was added to the solution and electroplated under the same plating conditions. As seen in FIG. 4, the addition of a leveler to the plating composition also resulted in a complete loss of nanotwinned copper.

Example 5

Figure 5:
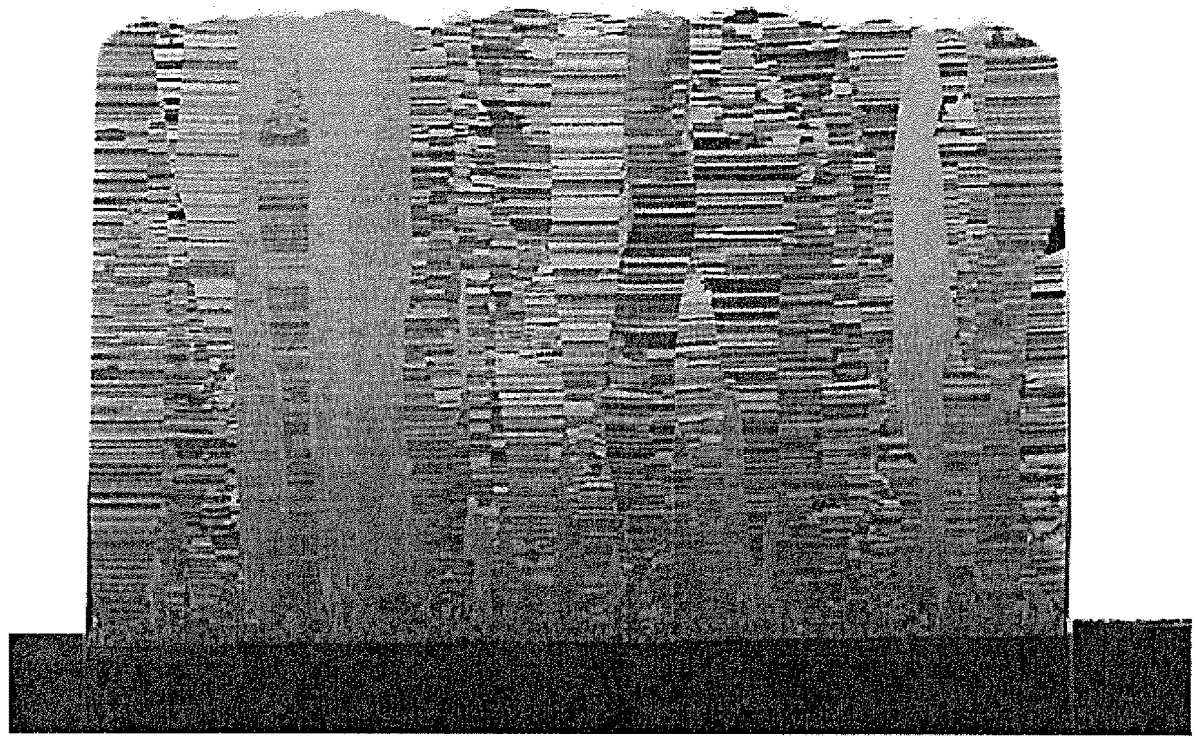
FIG. 5 depicts an SEM (75 µm width at 4K magnification) of a copper deposit produced in accordance with Example 5.

The same bath, as described in Example 2, was prepared, and a substrate 70 μm wide was plated at 6 ASD to create a 40 μm tall pillar. The results show a high density of nanotwinned copper, as depicted in FIG. 5.

Example 6

Figure 6:
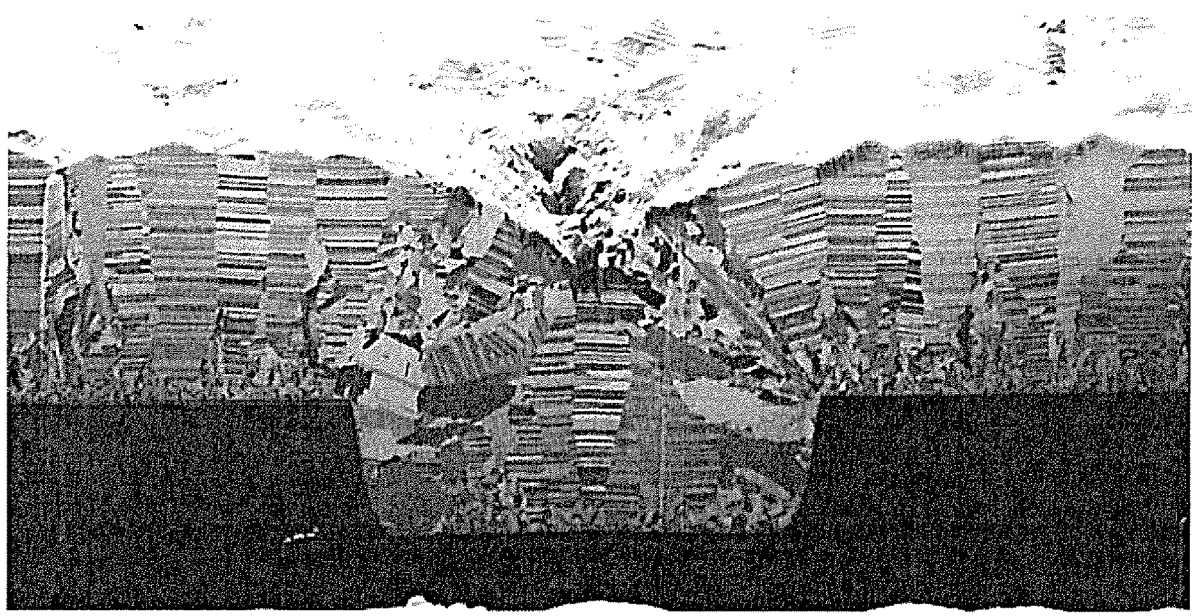
FIG. 6 depicts an SEM (50 µm width at 6K magnification) of a copper deposit produced in accordance with Example 6.

The same bath, as described in Example 5, was prepared, and a substrate containing a via was plated. The results show a high majority of nanotwinned copper, as depicted in FIG. 6.

Example 7

An additive can be prepared by reacting an aminic or ammonium alcohol with 2,3-epoxy-1-propanol. The general reaction procedure is as follows:

A boron trifluoride etherate (5 mmol) solution in methanol was added dropwise to a solution of 2,3-epoxy-1-propanol (2 mol) and N-methyldiethanolamine (0.2 mol) in a 1 L round bottom flask equipped with a thermometer, reflux condenser, and magnetic stirrer. The temperature was allowed to increase freely during exotherm and heated at its maximum temperature for 30 minutes. The reaction was then allowed to cool to less than 100° C., where water was added to make a 20% w/w solution that continued to stir for 4 hours. This solution was then filtered and used as-is.

The bath, as described in Example 2, was plated using the above-prepared additive.

Figure 7:
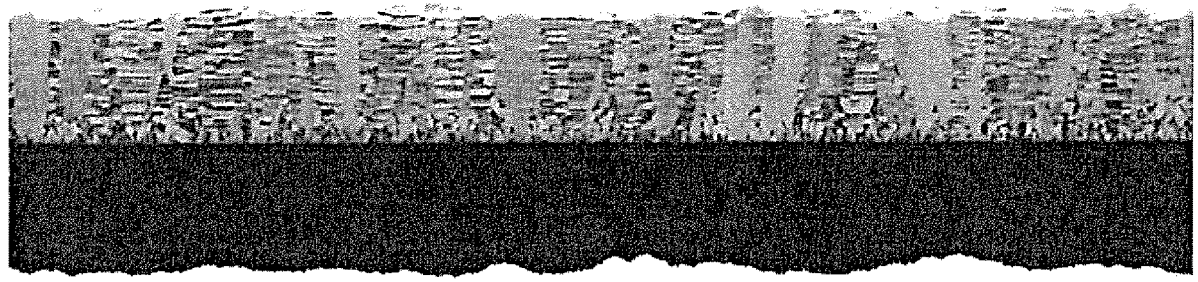
FIG. 7 depicts an SEM (30 µm width at 10K magnification) of a copper deposit produced in accordance with Example 7.
Figure 8:
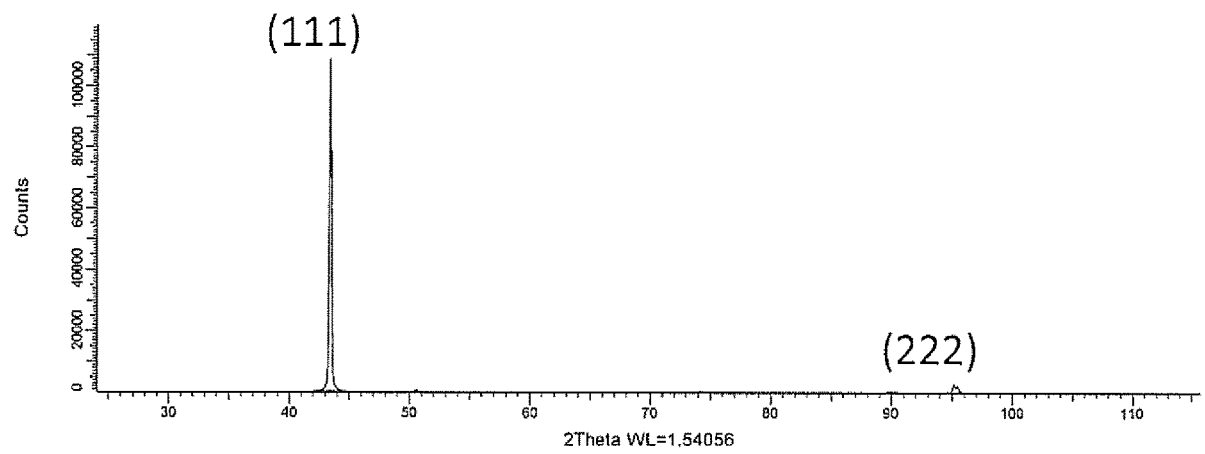
FIG. 8 depicts the grain orientation of the copper deposit produced in accordance with Example 7.

The results show faster nanotwin initiation from the copper seed. Also, a denser array of nanotwinned columnar growth is observed, as depicted in FIG. 7. The grain structure of the copper deposit is depicted in FIG. 8 as being dominated by a (111) grain orientation.

As can be seen from the Examples and Comparative Examples, the copper electroplating composition of the invention is capable of depositing a plated copper structure that comprises a high density of nanotwinned columnar copper grains.

Finally, it should also be understood that the following claims are intended to cover all of the generic and specific features of the invention described herein and all statements of the scope of the invention that, as a matter of language might fall therebetween.

What is claimed is:

1. A copper electroplating solution consisting essentially of:
    a) a copper salt;
    b) a source of halide ions; and
    c) a linear or branched polyhydroxyl, wherein the linear or branched polyhydroxyl comprises a reaction product between 2,3-epoxy-4-propanol and aminic alcohol or ammonium alcohol; and
    d) an acid;
        wherein the copper electroplating solution is configured for depositing nanotwinned copper on a substrate.

2. The copper electroplating solution according to claim 1, wherein the copper salt is copper sulfate.

3. The copper electroplating solution according to claim 1, wherein the acid comprises sulfuric acid or methane sulfonic acid.

4. The copper electroplating solution according to claim 1, wherein the aminic alcohol or the ammonium alcohol is selected from the group consisting of ethanolamine, triethanolamine, propanolamine, isopropanolamine, diisopropanolamine, triisopropanolamine, N-methyl diethanolamine, N-ethyl diethanolamine, N-propyl diethanolamine, methyl monoethanolamine, N,N-dimethyl ethanolamine, N,N-diethyl ethanolamine, N-propyl monoethanolamine, N-propyl diethanolamine, N-butyl ethanolamine, N-butyl diethanolamine, N,N-dibutyl ethanolamine, hydroxy ethyl morpholine, 2-piperidino ethanol, diethanol isopropanolamine, N-(2-hydroxyethyl) pyrrolidine, choline chloride, b-methylcholine chloride, Bis(2-hydroxyethyl)dimethylammonium chloride, tris(2-hydroxyethyl)methylammonium chloride, carnitine chloride, (2-hydroxyethyl)dimethyl(3-sulfopropyl) ammonium chloride, and combinations of the foregoing.

5. The copper electroplating solution according to claim 1, wherein the copper electroplating solution is at least substantially free of any other accelerator, brightener, carrier, wetter, or leveler or any additional compound that can function as an accelerator, brightener, carrier, wetter, or leveler.

6. The copper electroplating solution of claim 1, wherein in reacting the aminic or ammonium alcohol with 2,3-epoxy-1-propanol, the molar ratio of amine to the 2,3-epoxy-1-propanol is in the range of 0.01 to 0.5.

7. The copper electroplating solution of claim 6, wherein in reacting the aminic or ammonium alcohol with 2,3-epoxy-1-propanol, the molar ratio of amine to the 2,3-epoxy-1-propanol is in the range of 0.01 to 0.2.

8. A method of electrodepositing copper on a substrate, the method comprising the steps of:
   a. contacting a surface of the substrate and at least one anode with the copper electroplating solution of claim 1; and
   b. applying an electric voltage between the surface of the substrate and the at least one anode such that cathodic polarity is imposed upon the substrate relative to the at least one anode;
   wherein a copper deposit having a high density of nanotwinned columnar copper grains is deposited on the substrate.

9. The method according to claim 8, wherein the nanotwinned copper deposit is in a (111) orientation.

10. The method according to claim 8, wherein the copper deposit comprises greater than 80% nanotwinned columnar copper grains.

11. The method according to claim 10, wherein the copper deposit comprises greater than 90% nanotwinned columnar copper grains.

12. The method according to claim 8, wherein the substrate comprises one or more features selected from the group consisting of pillars, pads, lines, via and combinations of one or more of the foregoing.

* * * * *

UNITED STATES PATENT AND TRADEMARK OFFICE
CERTIFICATE OF CORRECTION

PATENT NO. : 11,384,446 B2
APPLICATION NO. : 17/005407
DATED : July 12, 2022
INVENTOR(S) : Kyle M. Whitten et al.

It is certified that error appears in the above-identified patent and that said Letters Patent is hereby corrected as shown below:

In the Claims

Column 8, Line 54, Claim 1:
Delete "2,3-epoxy-4-propanol" and replace it with 2,3-epoxy-1-propanol Signed and Sealed this
Twenty-ninth Day of August, 2023

Katherine Kelly Vidal
*Director of the United States Patent and Trademark Office*